US011463297B2

(12) United States Patent
Hao et al.

(10) Patent No.: US 11,463,297 B2
(45) Date of Patent: Oct. 4, 2022

(54) ADAPTIVE MODULO BASE SELECTION FOR NON-LINEAR PRECODING

(71) Applicant: QUALCOMM Incorporated, San Diego, CA (US)

(72) Inventors: Chenxi Hao, Beijing (CN); Yu Zhang, Beijing (CN); Liangming Wu, Beijing (CN); Hao Xu, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/264,261

(22) PCT Filed: Aug. 7, 2018

(86) PCT No.: PCT/CN2018/099199
§ 371 (c)(1),
(2) Date: Jan. 28, 2021

(87) PCT Pub. No.: WO2020/029076
PCT Pub. Date: Feb. 13, 2020

(65) Prior Publication Data
US 2021/0297302 A1  Sep. 23, 2021

(51) Int. Cl.
*H04L 23/02* (2006.01)
*H04L 27/34* (2006.01)
(Continued)

(52) U.S. Cl.
CPC ....... *H04L 27/3405* (2013.01); *H04B 17/336* (2015.01); *H04B 17/373* (2015.01); *H04L 5/0057* (2013.01)

(58) Field of Classification Search
CPC ..... H04L 1/0054; H04L 1/005; H04L 5/0051; H04L 5/0007; H04B 7/0617; H04B 7/0626
(Continued)

(56) References Cited

U.S. PATENT DOCUMENTS

2015/0155966 A1\* 6/2015 Zeng ................ H04L 1/0003
370/329
2016/0066346 A1 3/2016 Azad et al.
(Continued)

FOREIGN PATENT DOCUMENTS

WO  2017136068 A1  8/2017

OTHER PUBLICATIONS

Huawei et al., "Non-Linear Precoding for Downlink Multiuser MIMO", 3GPP TSG RAN WG1 Meeting#88, R1-1701678, Feb. 17, 2017 (Feb. 17, 2017), pp. 1-5.
(Continued)

*Primary Examiner* — Khai Tran
(74) *Attorney, Agent, or Firm* — Qualcomm Incorporated

(57) ABSTRACT

Certain aspects of the present disclosure provide techniques for adaptive modulo base selection for non-linear precoding. Aspects provide a method for wireless communications that can be performed by a base station (BS). The BS adaptively selects a modulo base for a data stream for at least one user equipment (UE) in a transmission to one or more UEs. The BS selects the modulo base based on one or more parameters. The BS transmits a signal for at least one UE of the one or more UEs to identify the selected modulo base. The BS performs the transmission to the one or more UEs. The UE receives the transmission from the BS and the signal for the identification of the selected modulo base. Based on the
(Continued)

signal, the UE determines the modulo base for at least one data stream in the transmission and decodes the data stream using the modulo base.

29 Claims, 16 Drawing Sheets

(51) Int. Cl.
  *H04B 17/336* (2015.01)
  *H04B 17/373* (2015.01)
  *H04L 5/00* (2006.01)
(58) Field of Classification Search
  USPC .................................................. 375/262, 260
  See application file for complete search history.

(56) References Cited

U.S. PATENT DOCUMENTS

| | | | |
|---|---|---|---|
| 2018/0019899 A1* | 1/2018 | Kuchi | H04L 5/0026 |
| 2021/0075483 A1* | 3/2021 | Song | H04B 7/0626 |
| 2021/0211247 A1* | 7/2021 | Wang | H04L 1/00 |

OTHER PUBLICATIONS

International Search Report and Written Opinion—PCT/CN2018/099199—ISA/EPO—dated Apr. 30, 2019.
Hoshino K., et al., "An Extension of Tomlinson-Harashima Precoding for Downlink Multi-User MIMO Systems", 2017 IEEE 85th Vehicular Technology Conference (VTC Spring), IEEE, Jun. 4, 2017 (Jun. 4, 2017), pp. 1-6, XP033254297, DOI: 10.1109/VTCSPRING.2017.8108306, [retrieved on Nov. 14, 2017], Sections I and II.
Li A., et al., "A Two-Stage Vector Perturbation Scheme for Adaptive Modulation in Downlink MU-MIMO", IEEE Transactions on Vehicular Technology, IEEE, USA, vol. 65, No. 9, Sep. 1, 2016 (Sep. 1, 2016), pp. 7785-7791, XP011623046, ISSN: 0018-9545, DOI: 10.1109/TVT.2015.2489263 [retrieved on Sep. 15, 2016], Sections I and III.
Masouros C., et al., "Complex Interference Optimization for Power Loss Reduction in MIMO-THP Transmission", Signals, Systems and Computers (ASILOMAR), 2011 Conference Record of the Forty Fifth Asilomar Conference on, IEEE, Nov. 6, 2011 (Nov. 6, 2011), pp. 1278-1282, XP032172297, DOI:10.1109/ACSSC.2011.6190222, ISBN: 978-1-4673-0321-7, Sections I, II and IV.
Mazet L., et al., "MU-MIMO: Non-Linear Precoding for DL-MIMO", C80216m-08_842, IEEE Draft, C80216M-08_842, IEEE-SA, Piscataway, NJ USA, vol. 802.16m, Jul. 14, 2008, pp. 1-7, XP017796593, [retrieved on Jul. 14, 2008], The whole document, (Jul. 14, 2008).
Mhearain F.N., et al., "A Comparison of Precoding Techniques for the Dual Polarised Land Mobile Satellite Channel", 2014 7th Advanced Satellite Multimedia Systems Conference and the 13th Signal Processing for Space Communications Workshop (ASMS/SPSC), IEEE, Sep. 8, 2014 (Sep. 8, 2014), pp. 32-36, XP032668110, DOI: 10.1109/ASMS-SPSC.2014.6934520 [retrieved on Oct. 22, 2014], Section IV.
Supplementary European Search Report—EP18929059—Search Authority—The Hague—dated Feb. 23, 2022.
Trifan R-F., et al., "Non-Linear Precoding Performance in Spatio-Temporally Correlated MU-MIMO Channels", 2018 International Conference ON Communications (COMM), IEEE, Jun. 14, 2018 (Jun. 14, 2018), pp. 181-186, XP033396345, DOI: 10.1109/ICCOMM.2018.8453635 [retrieved on Aug. 31, 2018], Sections I and II.

* cited by examiner

1100

| | QPSK | 16QAM | 64QAM | 256QAM |
|---|---|---|---|---|
| 0 | 1.4142 | 1.2649 | 1.2344 | 1.227 |
| 1 | 2.1213 | 1.8974 | 1.8516 | 1.8407 |
| 2 | 2.8284 | 2.5298 | 2.4689 | 2.4543 |
| 3 | - | - | - | - |

| Value | 0 | 1 | 2 | 3 |
|---|---|---|---|---|
| Scaling factor $\beta$ | 1 | 1.5 | 2 | - |

FIG. 12

ADAPTIVE MODULO BASE SELECTION FOR NON-LINEAR PRECODING

CROSS-REFERENCE TO RELATED APPLICATION

This application is a national stage application under 35 U.S.C. 371 of PCT/CN2018/099199, filed Aug. 7, 2018, which is herein incorporated by reference herein in its entirety for all applicable purposes.

Field of the Disclosure

Aspects of the present disclosure relate to wireless communications, and more particularly, to techniques for adaptive modulo base selection for non-linear precoding.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes adaptively selecting a modulo base for a data stream for at least one user equipment (UE) in a transmission to one or more UEs. The modulo base is selected based on one or more parameters. The method includes transmitting a signal for at least one UE of the one or more UEs to identify the selected modulo base. The method includes performing the transmission to the one or more UEs.

Certain aspects provide a method for wireless communication by a UE. The method generally includes receiving a transmission from a BS. The transmission includes one or more data streams for the UE. The method includes receiving a signal from the BS for the identification of a modulo base applied to at least one of the one or more data streams. The method includes determining the modulo base for at least one of the one or more data streams based on the signal. The method includes decoding the at least one data stream using the modulo base.

Certain aspects provide an apparatus for wireless communication, such as a BS. The apparatus generally includes means for adaptively selecting a modulo base for a data stream for at least one UE in a transmission to one or more UEs. The modulo base is selected based on one or more parameters. The apparatus includes means for transmitting a signal for at least one UE of the one or more UEs to identify the selected modulo base. The apparatus includes means for performing the transmission to the one or more UEs.

Certain aspects provide an apparatus for wireless communication, such as a UE. The apparatus generally includes means for receiving a transmission from a BS. The transmission includes one or more data streams for the apparatus. The apparatus includes means for receiving a signal from the BS for the identification of a modulo base applied to at least one of the one or more data streams. The apparatus includes means for determining the modulo base for at least one of the one or more data streams based on the signal. The apparatus includes means for decoding the at least one data stream using the modulo base.

Certain aspects provide an apparatus for wireless communication, such as a BS. The apparatus generally includes at least one processor coupled with a memory and configured to adaptively select a modulo base for a data stream for at least one UE in a transmission to one or more UEs. The modulo base is selected based on one or more parameters. The apparatus includes a transmitter configured to transmit a signal for at least one UE of the one or more UEs to identify the selected modulo base. The transmitter is configured to perform the transmission to the one or more UEs.

Certain aspects provide an apparatus for wireless communication, such as a UE. The apparatus generally includes a receiver configured to receive a transmission from a BS. The transmission includes one or more data streams for the apparatus. The apparatus includes receiver is configured to receive a signal from the BS for the identification of a modulo base applied to at least one of the one or more data streams. The apparatus includes at least one processor coupled with a memory and configured to determine the modulo base for at least one of the one or more data streams based on the signal. The at least one processor is configured to decode the at least one data stream using the modulo base.

Certain aspects provide a computer readable medium having computer executable code stored thereon for wireless communication by a BS. The computer readable medium generally includes code for adaptively selecting a modulo base for a data stream for at least one UE in a transmission to one or more UEs. The modulo base is selected based on one or more parameters. The computer readable medium includes code for transmitting a signal for at least one UE of the one or more UEs to identify the selected modulo base. The computer readable medium includes code for performing the transmission to the one or more UEs.

Certain aspects provide a computer readable medium having computer executable code stored thereon for wireless communication by a UE. The computer readable medium generally includes code for receiving a transmission from a BS. The transmission includes one or more data streams for the UE. The computer readable medium includes code for receiving a signal from the BS for the identification of a modulo base applied to at least one of the one or more data streams. The computer readable medium includes code for determining the modulo base for at least one of the one or more data streams based on the signal. The computer readable medium includes code for decoding the at least one data stream using the modulo base.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 11 is a table with an example mapping of modulo sizes and values to modulo bases, in accordance with certain aspects of the present disclosure.

FIG. 12 is a table with an example mapping of values to scaling factors, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
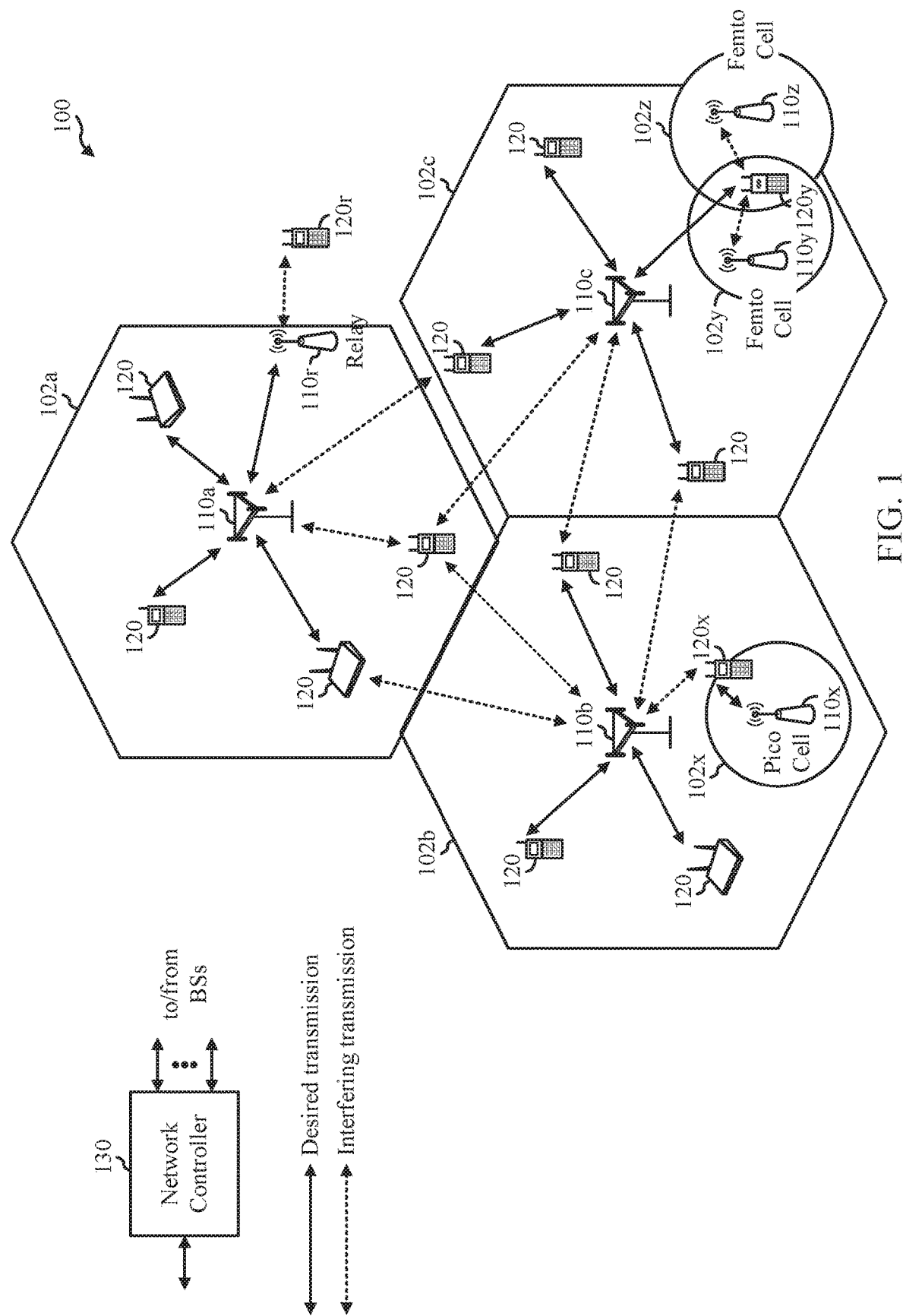
FIG. 1 is a block diagram conceptually illustrating an example telecommunications system, in accordance with certain aspects of the present disclosure.

Aspects of the present disclosure provide apparatus, methods, processing systems, and computer readable mediums for adaptive modulo base selection for non-linear precoding.

Certain network, such as new radio (NR) or 5G technology systems, may use non-linear precoding (NLP) for some signals. NLP involves performing a modulo operation to the transmitted signal. The transmitter (e.g., a base station (BS) or next generation Node B (gNB)) may account for potential interference or noise between signals to multiple receivers (e.g., multiple user equipments (UEs). The transmitter may perturb a constellation symbol, associated with the data stream to one of the receivers, to account for the potential interference or noise. The perturbed constellation symbol may be in a different constellation than the original constellation symbol. The transmitter performs the modulo operation to return the perturbed constellation symbol to the original constellation. The modulo operation is associated with the modulo base which defines the lattice spacing between constellation points. The receiving device receives the transmitted signal and performs the modulo operation to demap the received signal to a nearest constellation point.

In some cases, the actual interference is different than the potential interference applied by the transmitter during the precoding and the noise may impact the received signal, then the received signal may be in a different lattice and the receiver demaps to the incorrect constellation point. Applying a larger modulo base may improve the receiver decoding accuracy, but uses more power to transmit the signal, whereas a smaller modulo base uses less transmission power but may increase the block error rate (BLER). Therefore, techniques for selecting the modulo base are desirable.

Accordingly, aspects of the present disclosure provide apparatus and techniques for adaptive selection of the modulo base based on the various parameters. Thus, the transmitter and receiver can dynamically/adaptively select the modulo base to balance power consumption and decoding accuracy.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. A BS 110 in the wireless communication network 100 may adaptively select a modulo base (e.g., for non-linear precoding) for a data stream to a UE 120 in a transmission and sends a signal to the UE 120 for identifying the selected modulo base. The BS 110 performs the transmission to the UE 120. The UE 120 receives the transmission and the signal from the BS 110 and determines the selected modulo base for the data stream in the transmission based on the signal. The UE 120 decodes the data stream using the determined modulo base.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may, be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may, support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
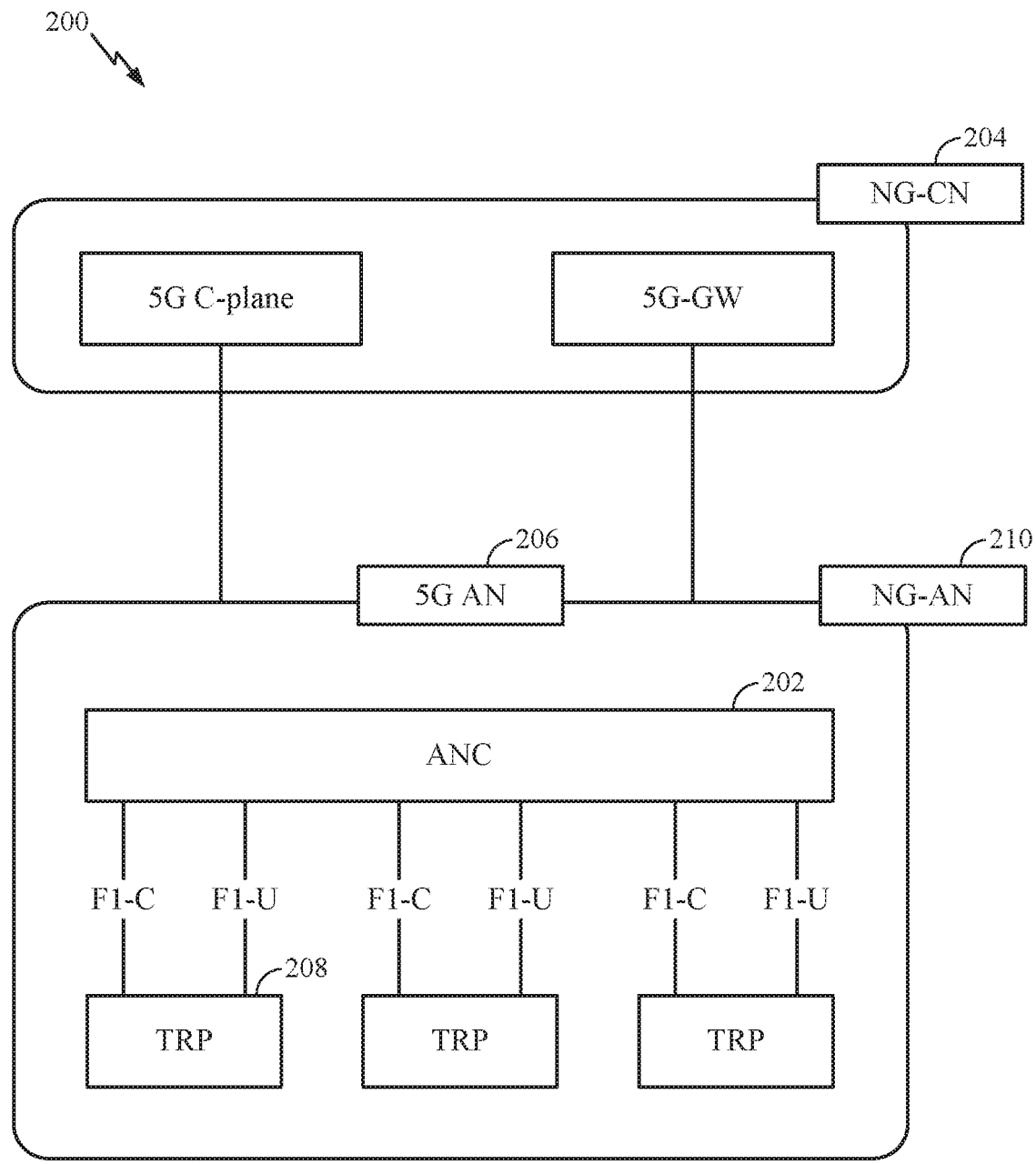
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
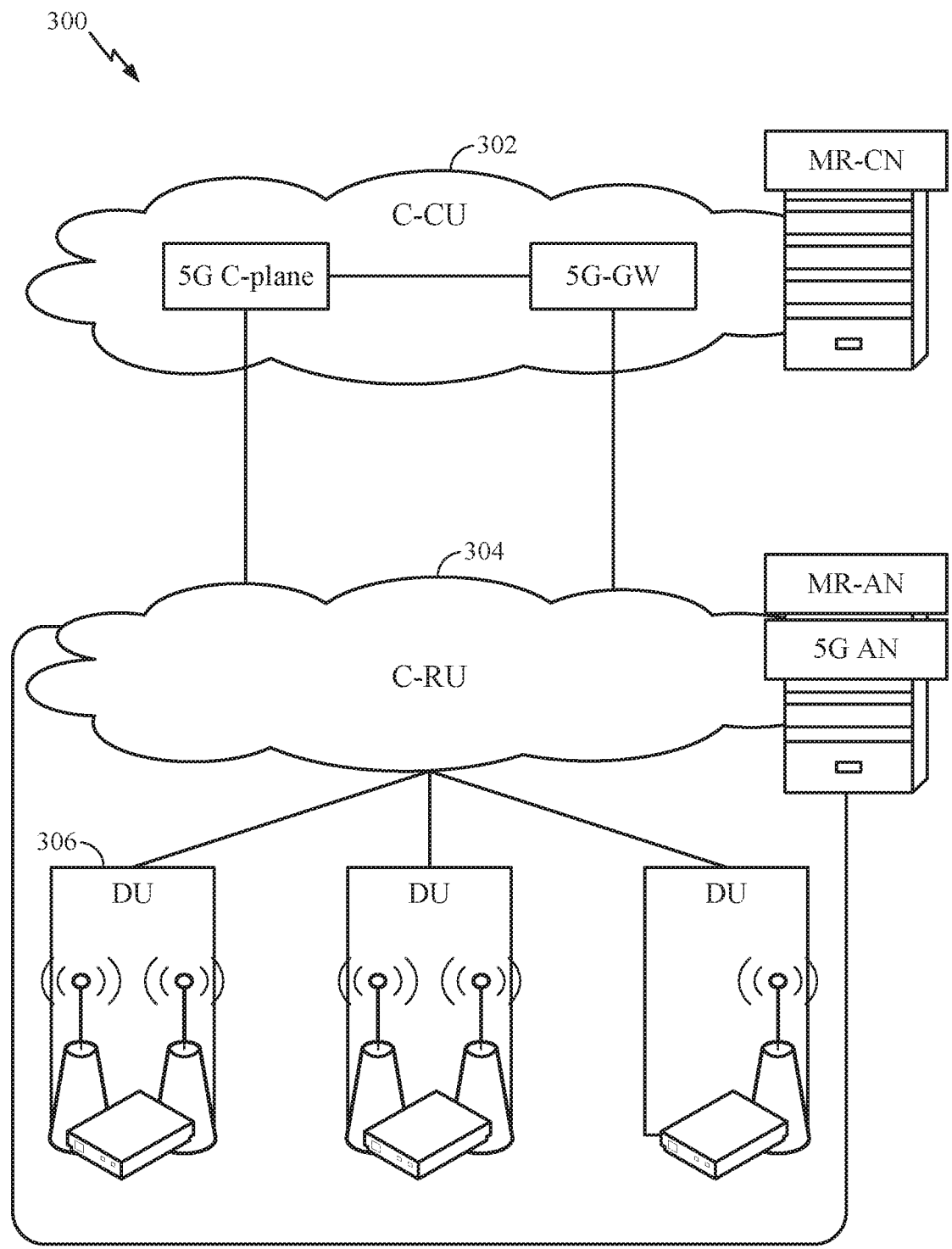
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
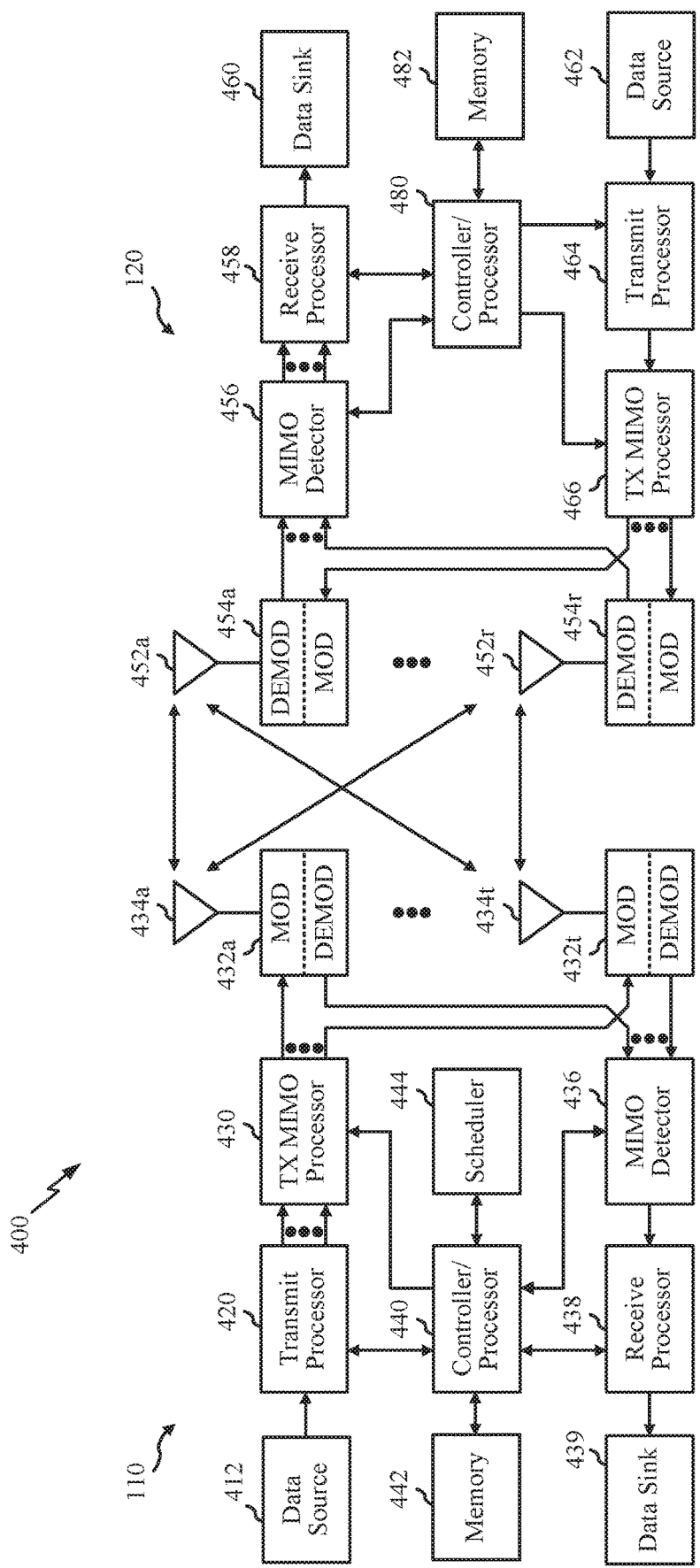
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for adaptive modulo base selection for non-linear precoding.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively.

Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
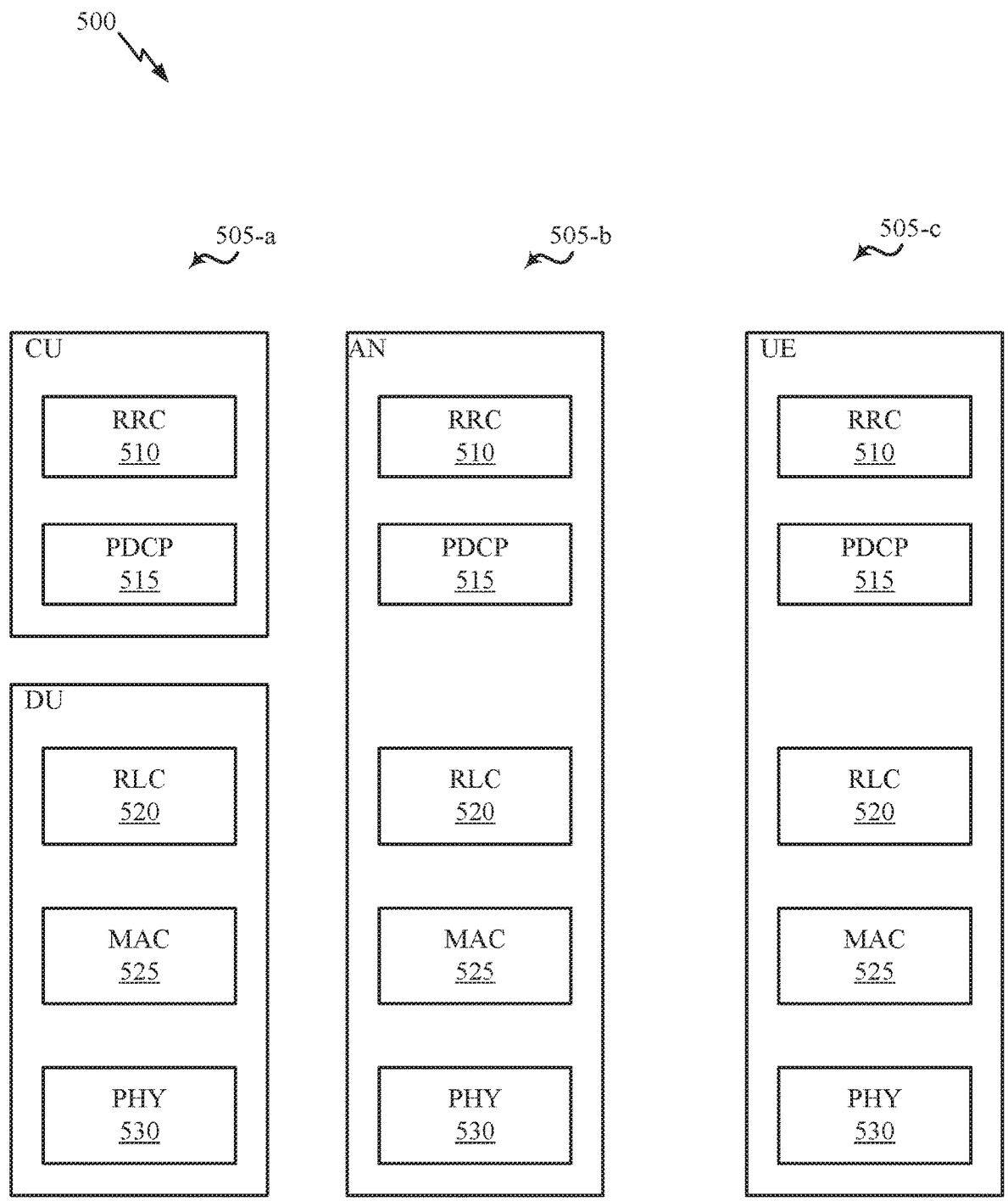
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
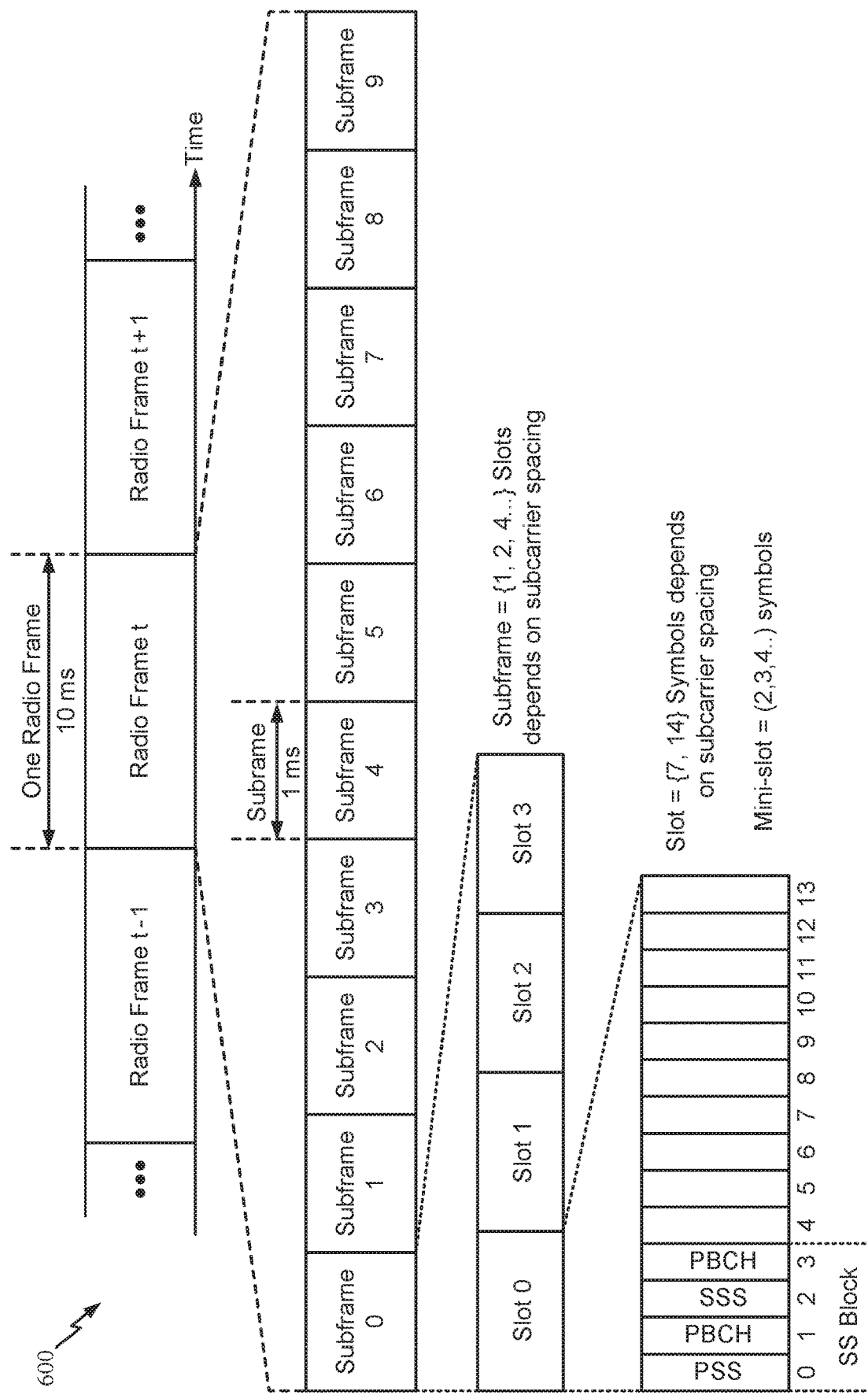
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services. UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Adaptive Modulo Base Selection for Non-Linear Precoding

Aspects of the present disclosure provide apparatus, methods, processing systems, and computer readable mediums for adaptive modulo base selection for non-linear precoding.

Certain network, such as new radio (NR) or 5G technology systems, may use non-linear precoding (NLP) for some signals. NLP involves performing a modulo operation to the transmitted signal. The transmitter (e.g., a base station (BS) or next generation Node B (gNB)) may account for potential interference or noise between signals to multiple receivers (e.g., multiple user equipments (UEs)). One example of NLP is Tomlinson-Harashima precoding.

Figure 7:
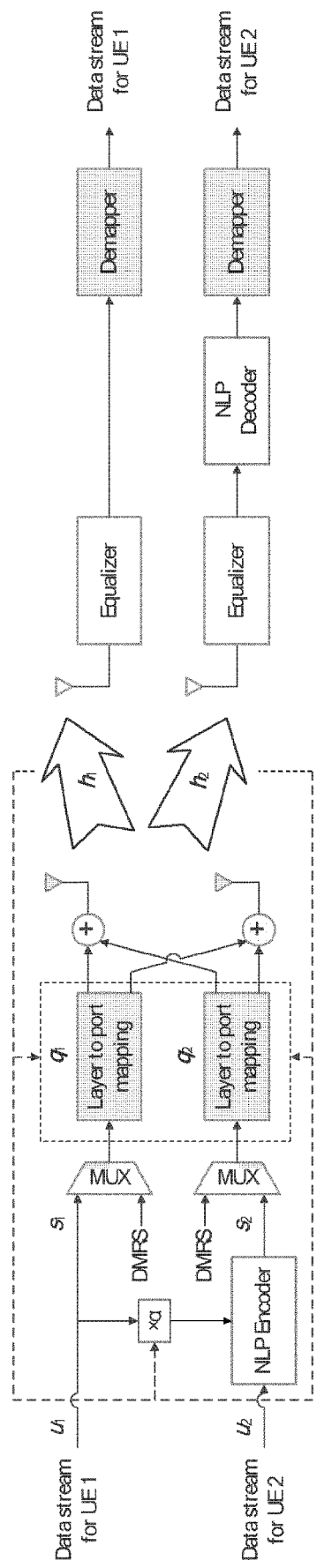
FIG. 7 is an example transmitter configured for non-linear precoding and receiver configured for non-linear precoding decoding, in accordance with certain aspects of the present disclosure.

FIG. 7 is an example transmitter configured for non-linear precoding and receiver configured for non-linear precoding decoding, in accordance with certain aspects of the present disclosure. As shown in FIG. 7, the transmitter may have a data stream $u_1$ for the UE 1 and a data stream $u_2$ for the UE 2. The transmitter may use linear precoding for the data stream $u_j$. Data stream $u_1$ is mapped to a sequence of symbols $s_j$, the sequence of symbols $s_j$ is transmitted using a linear precoder $q_j$. For NLP, the transmitter includes an NLP encoder for the data steam $u_2$ as shown in FIG. 7. The transmitter predicts/estimates/models potential interference a on the data steam $u_2$ from the transmitted data stream $u_1$ (e.g., signal leakage). The data steam $u_2$ and potential interference $u_j \times \alpha$ a are inputs to the NLP encoder. Although FIG. 7 shows precoding for data streams for two UEs, there could be more than two UEs. In the case of more than two UEs, the NLP encoding may account for the interference from multiple UEs. For example, for a data stream for a UE 3 (not shown), the NLP encoder for the data stream $u_3$ for a UE 3 may account for interference from $u_1$ and $u_2$, and so on for additional data streams.

Figure 8A:
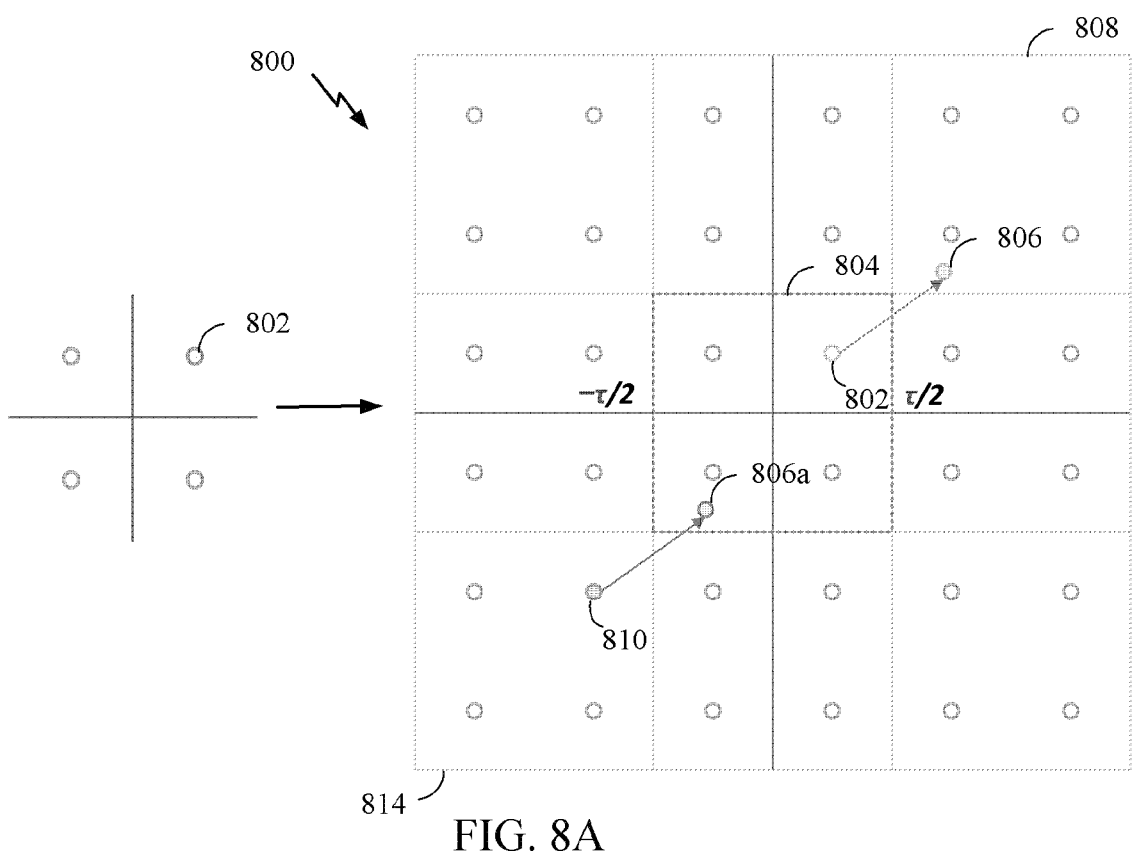
FIG. 8A is an example encoding non-linear precoding modulo operation, in accordance with certain aspects of the present disclosure.

The NLP encoder attempts to pre-cancel the potential interference by subtracting $u_1 \times \alpha$ from $u_2$. The transmitter may perturb a constellation symbol, associated with the data stream to one of the receivers, to account for the potential interference. The perturbed constellation symbol may be far away from the origin. As shown in FIG. 8A, the cancellation of the interference (shown as the arrow in the figure) from the data stream $u_1$ on the data steam $u_2$ perturbs the constellation symbol 802 generated based on the data stream $u_2$ resulting in a point 806. Apparently, point 806 requires a larger power consumption than transmitting any constellation points in constellation 804. Such power consumption may exceed the total power transmission limit so that power normalization has to be applied. Then in that sense, the received signal strength will be decreased due to the power normalization. To limit the transmission power to a power constraint, the NLP encoder performs a modulo operation.

The modulo operation returns the remainder of an input number divided by a divider. The divider is known as the modulo base. Mathematically, the output of the modulo operation can be expressed by $x_2 = u_2 - \alpha \times u_1 + d \times \tau$, where $\tau$ is the modulo base and d is an integer (positive, zero or negative), the output $x_2$ is a value between $-\tau/2$ and $\tau/2$. In some cases, $u_2 - \alpha \times u_1$ are complex numbers, the modulo operation is performed by real/image dimension, i.e., $Re\{x_2\} = Re\{u_2 - \alpha \times u_1\} + d_I \times \tau$ and $Im\{x_2\} = Im\{u_2 - \alpha \times u_1\} + d_Q \times \tau$. FIG. 8A gives an illustrated view of the modulo operation. The modulo base defines a region for the original constellation 804, and introduces remote constellations by replicating the original constellation along x and y axis with a periodicity of $\tau$. The distance between a remote constellation and the original constellation is given by $d_I$ and $d_Q$. In FIG. 8A, for example, point 806 after perturbation lies in a constellation 808 and the modulo operation returns the perturbed constellation symbol to the point 806a in the original constellation 804. Alternatively, this process can be considered as firstly choosing a constellation point in a remote constellation based on the potential interference to be cancelled, then secondly perturbing the constellation point in the remote constellation so that the final transmitted signal lies in the original constellation. As shown in FIG. 8A, transmitting the constellation symbol 802 is equivalent to transmitting the constellation symbol 810 because they are the same constellation point in their corresponding constellation, i.e., 804 and 814, respectively. Then the transmitter chooses to transmit the constellation symbol 810 rather than the constellation symbol 802 because the signal 806a after perturbation lies in the original constellation 804.

Figure 8B:
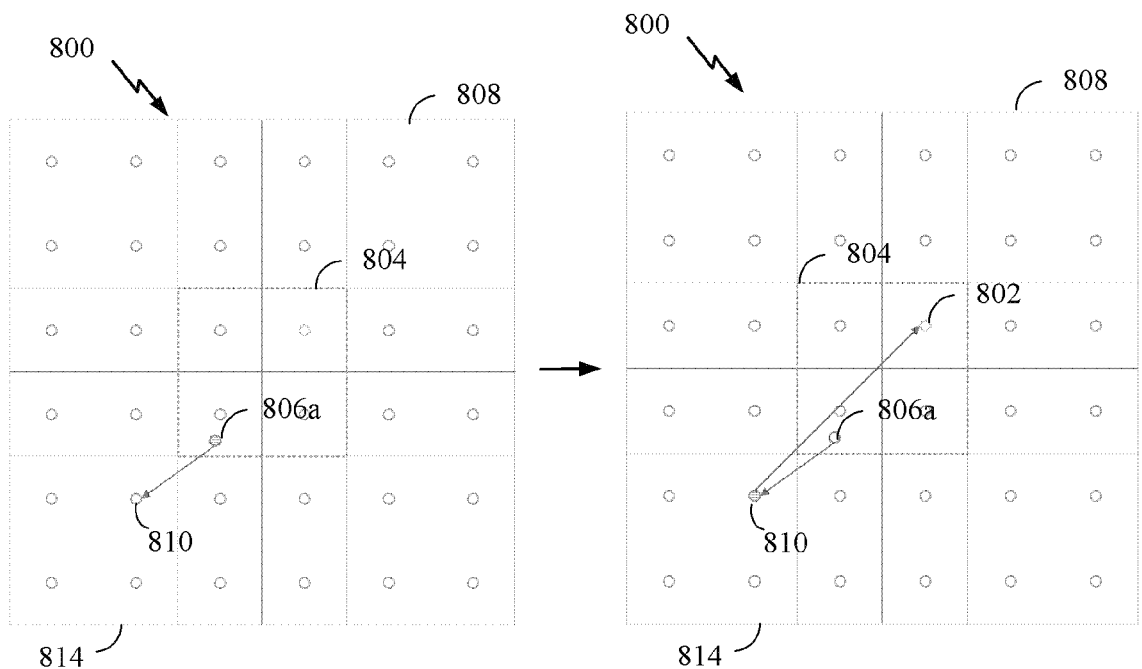
FIG. 8B is an example decoding non-linear precoding modulo operation, in accordance with certain aspects of the present disclosure.

The receiving device receives the transmitted signal. The receiving device performs linear decoding to demap the data stream for UE 1. The receiver performs a modulo operation to recover the original data stream for the UE 2. The receiving device includes an NLP decoder for decoding the data stream for UE 2 as shown in FIG. 7. The NLP decoder performs the modulo operation to demap the received signal to a nearest constellation point. As shown in FIG. 8B, if the interference obtained by the transmitter is exactly the same as the actual inter-user interference and there is no noise, the receiver obtains constellation symbol 810 in the remote constellation 814 after the transmitted signal going through the channel with actual interference added back and after the equalizer operation. Thus, when the UE performs the modulo operation, the constellation symbol 810 is returned to the constellation symbol 802, and the receiver correctly demaps the data stream.

Figure 8C:
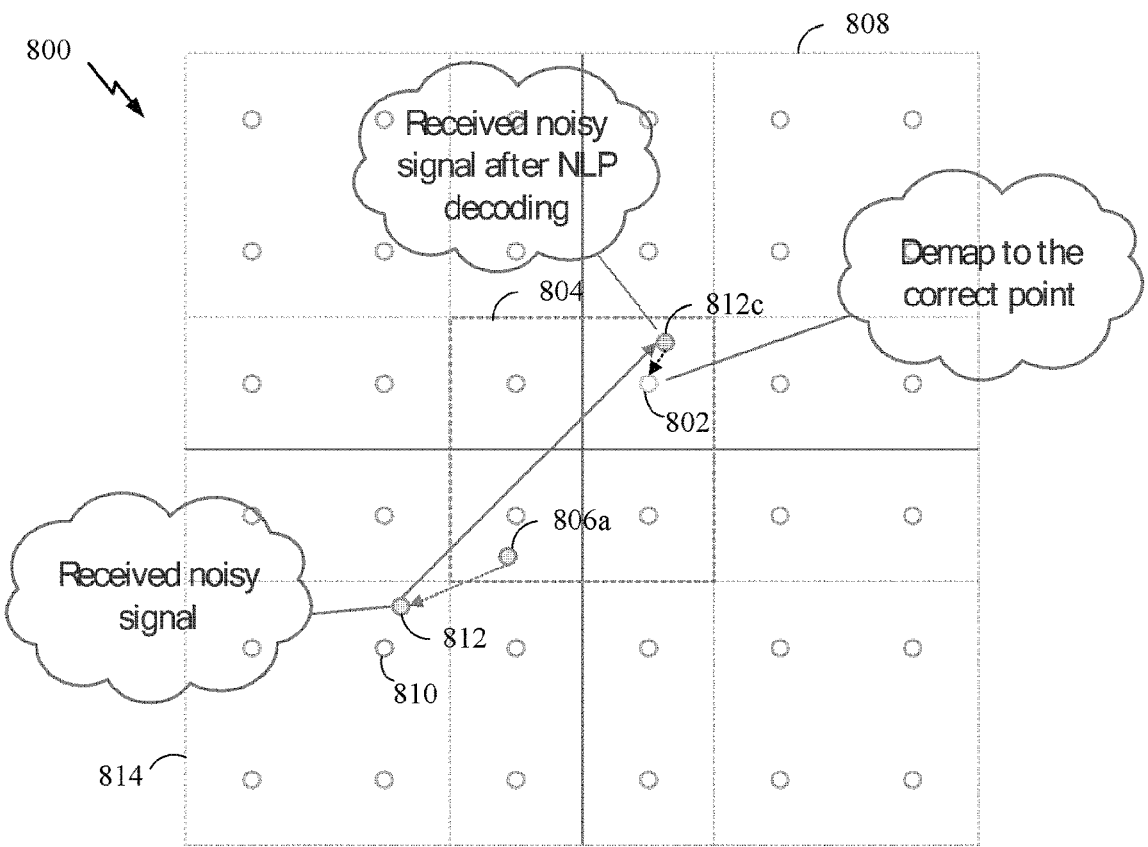
FIG. 8C is an example decoding non-linear precoding modulo operation with the evenly spaced constellations, in accordance with certain aspects of the present disclosure.

In some cases, the transmitter obtains imperfect knowledge of the channel state information at transmitter (CSIT), so that it has an impaired estimation of the actual interference. In addition, the noise will also impact the received signal. Thus, the received signal may not directly return to the transmitted constellation point in the remote/original constellation. As shown in FIG. 8C, when there is imperfect CSIT/perturbation, after going through the channel with interference added back and after performing equalization, the transmitted point 806a is received at the point 812, rather than the constellation symbol 810. As shown in FIG. 8C, the point 812 for the received noisy signal still falls within the same constellation 814 as the constellation symbol 810. Thus, after the receiver performs the modulo operation, the signal is shifted to the point 812c in same constellation as the original constellation symbol 802 and, therefore, demaps to the correct point with a high possibility.

Figure 8D:
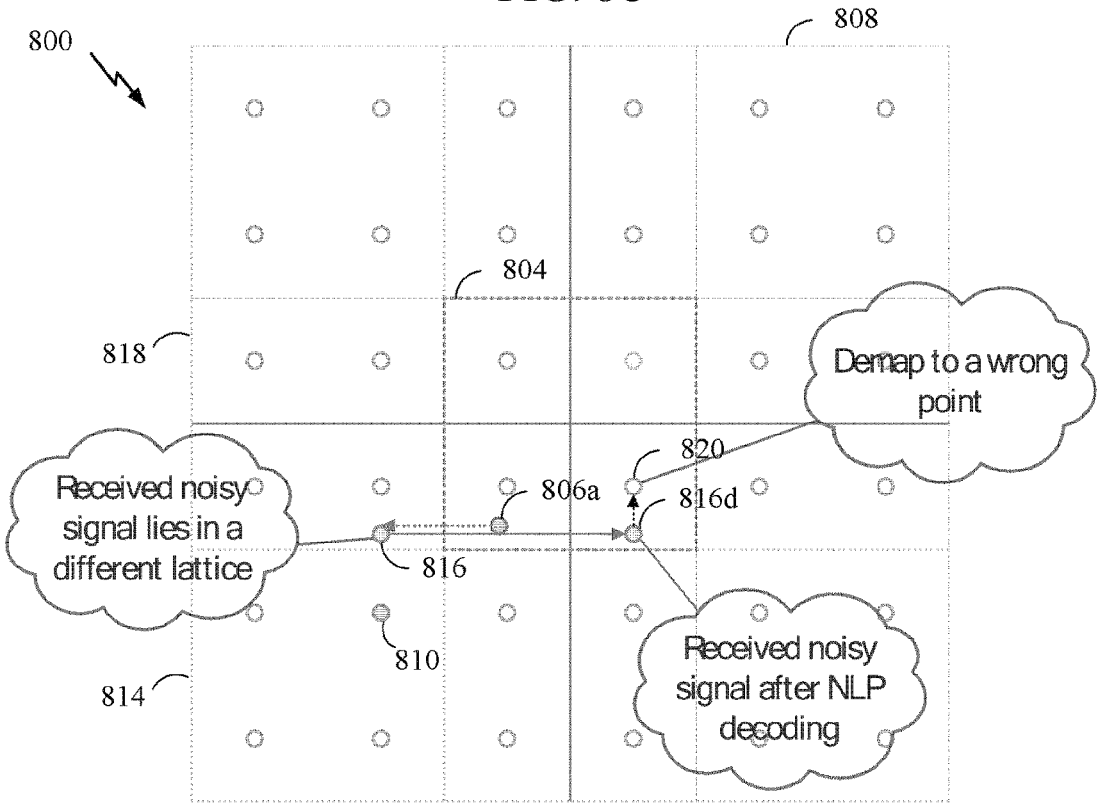
FIG. 8D is an example decoding non-linear precoding modulo operation with the evenly spaced constellations, in accordance with certain aspects of the present disclosure.

In some cases; however, when there is large impairment between the estimated interference and the actual interference or the noise variance is very large, the received signal may lie in a different constellation than the transmitted remote/original constellation. As shown in FIG. 8D, when there is large impairment between the estimated interference and the actual interference or the noise variance is very large, after going through the channel with the actual interference added back and after performing equalization, the transmitted point 806a is received at the point 816, rather than the constellation symbol 810. As shown in FIG. 8D, the point 816 for the received noisy signal falls in a different constellation 818 than the constellation symbol 810. Thus, after the receiver performs the modulo operation, the signal is moved to the point 816d far from the original constellation symbol 802 and, therefore, demaps to the incorrect constellation symbol 820.

Figure 9A:
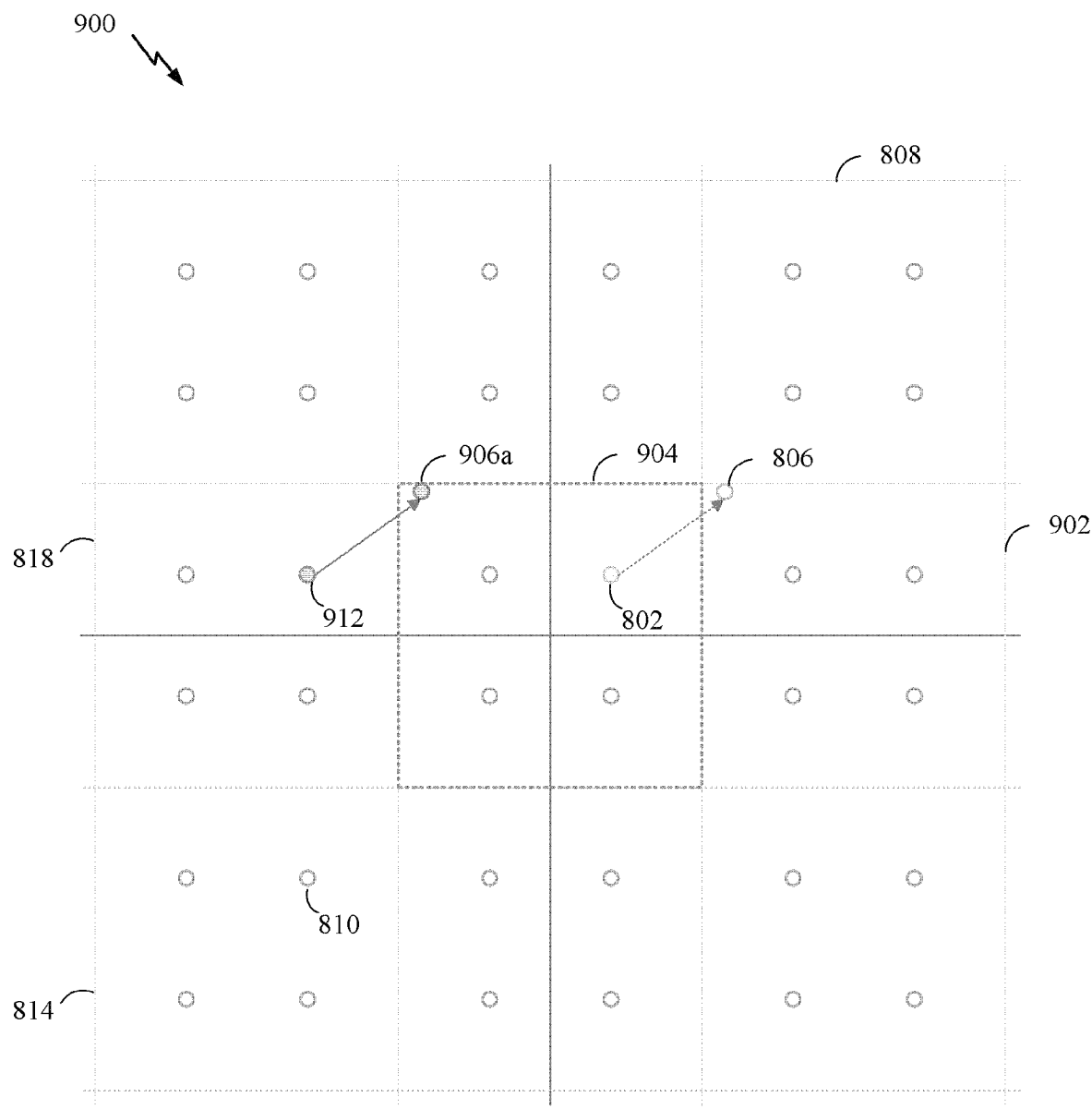
FIG. 9A is an example of the non-linear precoding modulo operation of FIG. 8A, with a larger modulo base and unevenly spaced constellations, in accordance with certain aspects of the present disclosure.
Figure 9B:
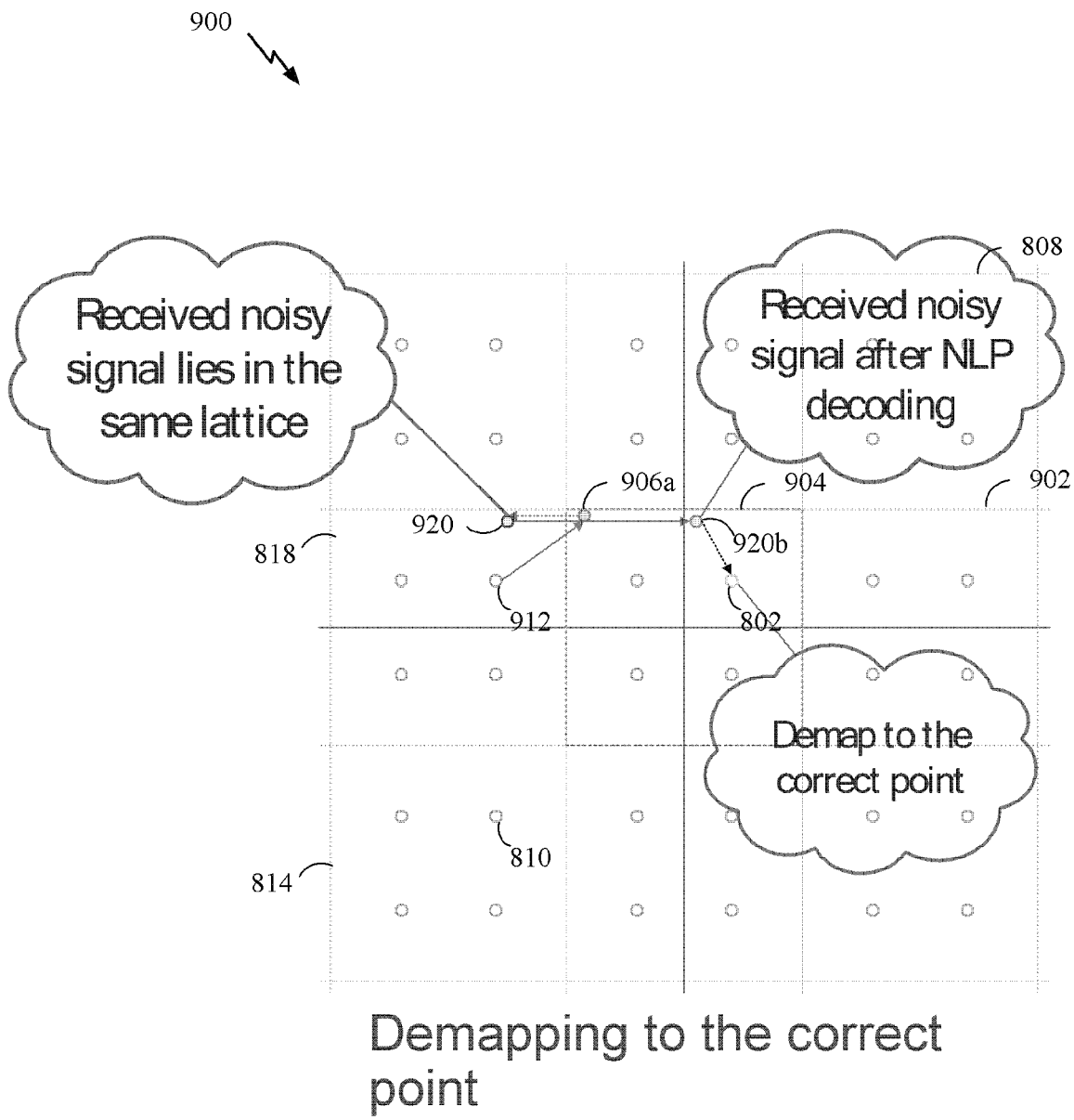
FIG. 9B is an example decoding non-linear precoding modulo operation with the larger modulo base and unevenly spaced constellations, in accordance with certain aspects of the present disclosure.

According to certain aspects, a larger modulo base may be selected to increase the lattice spacing of the constellation points. FIG. 9A is an example of the non-linear precoding modulo operation of FIG. 8A, with a larger modulo base and unevenly spaced constellations, in accordance with certain aspects of the present disclosure. As shown in FIG. 9A, due to the enlarged lattice spacing, the cancellation of the noise/interference (shown as the arrow in the figure) from the data stream $u_1$ on the data steam $u_2$ perturbs the constellation symbol 802 generated based on the data stream $u_2$ from the original enlarged constellation 904 with enlarged boundary to the point 806, in a different remote constellation 902 than the point 806 in the constellation 808 for the smaller lattice 800. Thus, when the NLP encoder performs the modulo operation, the point 806 is moved to perturbed point 906a in the original enlarged constellation 904. This is equivalent to firstly choosing transmitting constellation symbol 912 in the constellation 818, (rather than the constellation symbol 810 in the constellation 814) and secondly pre-cancelling the potential interference which results in the transmitted point 906a. Thus, even if the predicated/estimated/modeled interference has the same inaccuracy as in FIG. 8D, in this case the receiver still demaps to the correct point. As shown in FIG. 9B, even if there is large impairment between the estimated interference and the actual interference or the noise variance is very large, such that the transmitted point 906a is received at the point 920 in the remote constellation 818, after going through the channel with the actual interference added back and after performing equalization, the signal is perturbed to the point 920b in the original enlarged constellation 904 and, therefore, demaps to the correct constellation symbol 802, rather than the incorrect constellation symbol 820 as in FIG. 8D.

In NLP, choosing the modulo base is important. Applying a larger modulo base may improve the receiver decoding accuracy, but uses more power to transmit the signal and a large power normalization factor. Applying a smaller modulo base uses less transmission power but may increase the block error rate (BLER). Therefore, techniques for selecting the modulo base are desirable. In some examples, the modulo base is chosen such that the replicated constellation points have a uniform spacing; however, at low signal-to-noise ratio (SNR) and/or large channel knowledge impairment, the UE may confuse whether the received noisy signal is resulted by noise or modulo operation. In that case, a larger modulo base may help. Hence, an adaptive modulo base is desirable to enhance the NLP performance.

Accordingly, aspects of the present disclosure provide apparatus and techniques for adaptive selection of the modulo base based on the various parameters. Thus, the transmitter and receiver can dynamically/adaptively select the modulo base to balance power consumption and decoding accuracy. For example, the BS may adaptively select the modulo base based on the SNR, CSIT accuracy, and/or UE pairing. According to certain aspects, the BS signals selected modulo base to the UE. The UE may determine the modulo base based on modulation order and/or coding scheme and a value signaled by the BS. The signaling and determination may be based configured sets of modulo bases corresponding to combinations of the modulation and value.

Figure 10:
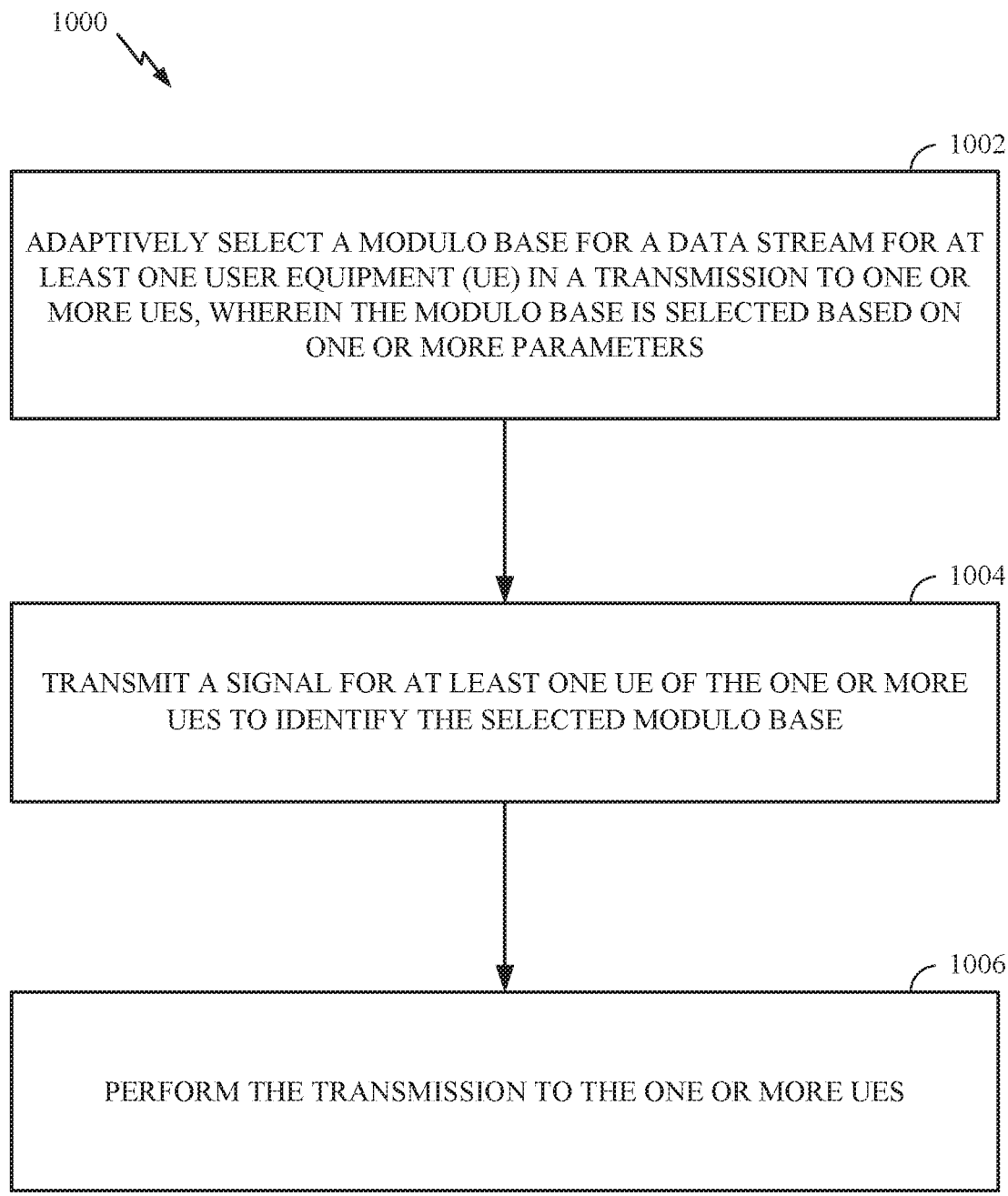
FIG. 10 is a flow diagram illustrating example operations by a transmitting device for wireless communications with adaptive modulo base selection for non-linear precoding, in accordance with certain aspects of the present disclosure.

FIG. 10 is a flow diagram illustrating example operations 1000 for wireless communications with adaptive modulo base selection for non-linear precoding, in accordance with certain aspects of the present disclosure. The operations 1000 may be performed, for example, by a transmitting device such as a BS (e.g., a BS 110 in the wireless communication network 100).

The operations 1000 may begin, at 1002, by adaptively selecting a modulo base for a data stream for at least one UE in a transmission to one or more UEs. The modulo base is selected based on one or more parameters. The one or more parameters may include a modulation order and/or coding scheme of the data stream of the at least one UE, a signal-to-noise-ratio of the at least one UE, or a signal-to-noise-plus-interference ratio (SINR) or geometry of the at least one UE, and/or accuracy of channel state information (CSI) of the one or more UEs obtained by the transmitting device. The adaptive selection may include increasing the modulo base if the SNR or SINR is below a threshold or the CSI accuracy obtained by the transmitting device is below a threshold. The adaptive selection may include decreasing the modulo base if SNR or SINR is above a threshold or the CSI accuracy obtained by the transmitting device is above a threshold. The selected modulo base may define an uneven lattice spacing.

According to certain aspects, the transmitting device may adaptively reselect the modulo base for subsequent transmissions based on changes to the one or more parameters.

According to certain aspects, the transmitting device may receive an indication from the at least one UE of a capability of the UE for performing a modulo operation. The adaptive selection and transmission based on modulo operation may be in response to the indication.

According to certain aspects, the transmitting device selects the modulo base from a set of candidate modulo bases. Selecting the modulo base may include selecting a scaling factor to be applied to a default modulo base. The set of candidate modulo bases may include an indication that no modulo operation is performed (i.e., linear precoding). The set of candidate modulo bases may include a first set of candidate modulo bases applied to a first modulation order and/or coding scheme, and a second set of candidate modulo bases applied to a second modulation order and/or coding scheme. As shown in the Table 1100 in FIG. 11, modulo bases may correspond to the modulation order (e.g., QPSK, 16 QAM, 64 QAM, 256 QAM) and/or coding scheme and a value (0, 1, 2, 3). Thus, the transmitting device can select a modulo base from a set of candidate modulo bases for a given modulation order and/or coding scheme. In some examples, each modulation order and/or coding scheme may be associated with a default modulo base (e.g., one candidate modulo base). In that case, the indicator may not be signaled, instead, the BS may only signal the modulation order and/or coding scheme and the UE determines the modulo base based on the signaled modulation order and/or coding scheme.

In some examples, the set of candidate modulo bases includes a first candidate modulo base of the first set of candidate modulo bases for the first modulation order and/or coding scheme obtained based on a first scaling factor and the first modulation order and/or coding scheme and a second candidate modulo base of the second set of candidate modulo bases for the second modulation order and/or coding scheme obtained based on the first scaling factor and the second modulation order and/or coding scheme. In some examples, the set of candidate modulo bases further includes a third candidate modulo base of the first set of candidate modulo bases for the first modulation order and/or coding scheme obtained based on a second scaling factor and the first modulation order and/or coding scheme and a fourth candidate modulo base of the second set of candidate modulo bases for the second modulation order and/or coding scheme obtained based on the second scaling factor and the second modulation order and/or coding scheme. As shown in the Table 1200 in FIG. 12, a set of scaling factors β may be defined. The scaling factors β may be applied to a formula involving the modulation order and/or coding scheme to obtain the modulo base. In some examples, there may be a default scaling factor (e.g., only one scaling factor). In this case, the BS may not signal the value, instead, the BS may only signal the modulation order and/or coding scheme, and the UE may determine the modulo base using the modulation order and/or coding scheme along with the default scaling factor. An example formula for the modulo base T may be as follows:

$$\tau = \sqrt{\frac{3M}{2(M-1)}} \times \beta$$

According to certain aspects, the set of candidate modulo bases may be fixed in the specification. The Table 1100 or the Table 1200, or information corresponding to the mapping in those tables may be configured at the transmitting device. For example, the information in the Tables 1100 or 1200 may be in the IEEE wireless standards and hardcoded in the transmitting device. The Tables 1100 and 1200 are one example. In some examples, different modulo base values, different modulation order and/or coding scheme, different values, different scaling factors may be configured.

At 1002, the transmitting device transmits a signal for at least one UE of the one or more UEs to identify the selected modulo base. In some examples, the transmitting device transmits a signal that indicates the modulation order and/or a coding scheme to the UE, corresponding to the selected modulo base. The signal may further include an indicator of the selected modulo base. The indicator together with the at least one of the modulation order or the coding scheme corresponds to selected modulo bases. In some examples, the transmitting device may signal the combination of modulation and the value 0-3 according to the Table 1100 in FIG. 11 to the UE allowing the UE to identify the corresponding modulo base. In some examples, the transmitting device may signal the value 0-3 according to the Table 1200 in FIG. 12 to the UE allowing the UE to identify the scaling factor β, and the transmitting device signals the modulation to the UE allowing the UE to compute the corresponding modulo base t using the formula above. The modulation and indicator may be signaled to the UE in downlink control information (DCI). In some cases, the indicator may be signaled to the UE via higher layer signaling RRC and/or a MAC CE.

According to certain aspects, the transmitting device configures the UE with the information from the Table 1100 or 1200. For example, the transmitting device may configure the UE with the information via higher layer signaling, such as by radio resource control (RRC) signaling or a medium access control (MAC) control element (CE). In some examples, the set of candidate modulo bases is first configured via RRC and a subset of the set of candidate modulo bases in configured by the MAC-CE, or the set of candidate modulo bases is explicitly specified in the specification and the subset is signaled via RRC and/or MAC-CE, or the set of candidate modulo bases is explicitly specified in the specification without downselection, and then DCI may signal the modulation and the indicator to indicate the specific modulo base from the subset. In some cases, the indicator may be signaled to the UE via higher layer signaling RRC and/or MAC-CE.

At 1004, the transmitting device performs the transmission to the one or more UEs. Accordingly to certain aspects, the transmission may be a multi-user (MU) transmission. Performing the transmission may include performing NLP on at least one data stream. The transmitting device may perturb a constellation symbol, generated based on the data stream, in an original constellation to a different constellation to account for predicted interference between at least two UEs and perform a modulo operation to return the perturbed symbol to the original constellation.

Figure 13:
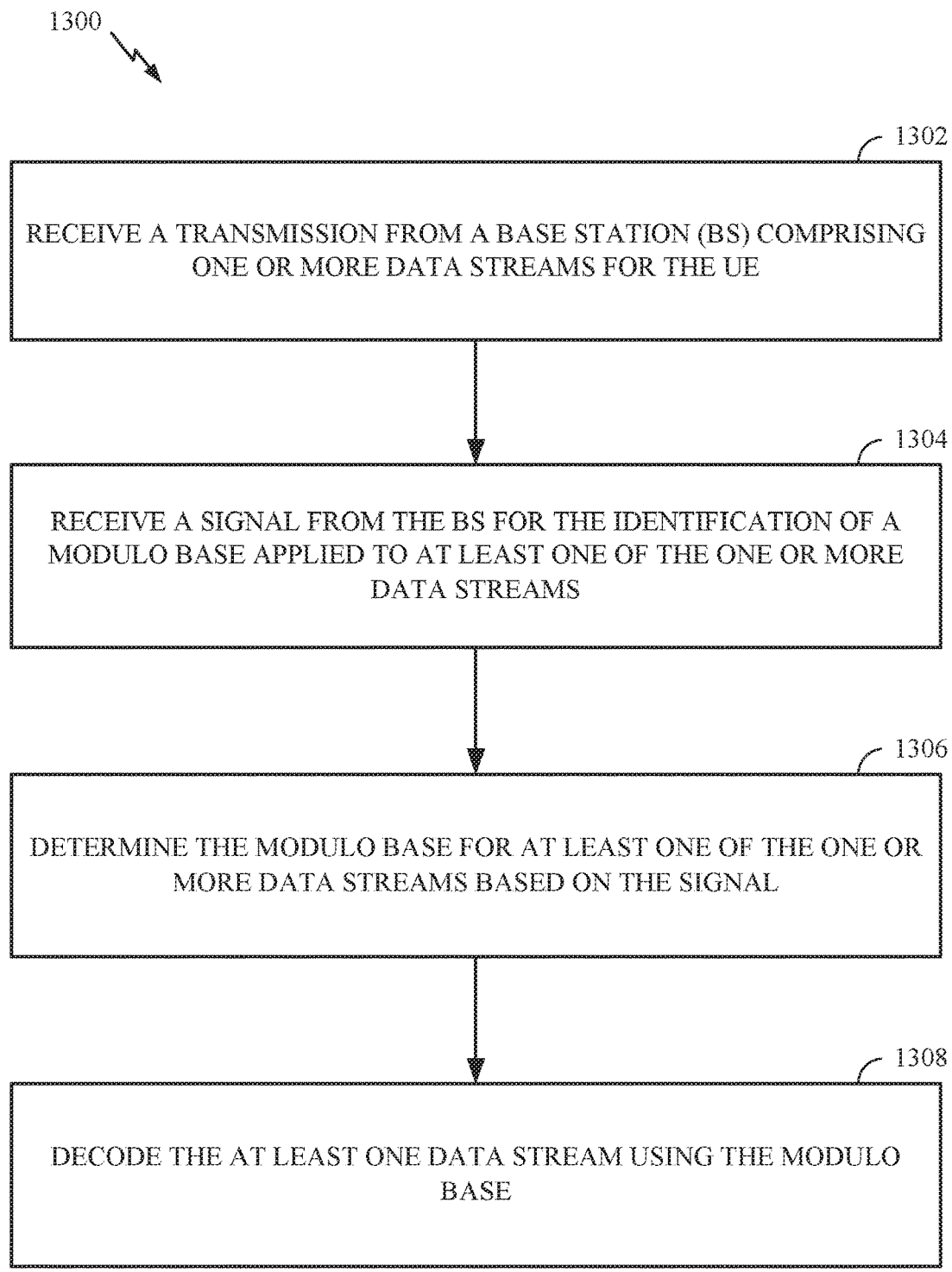
FIG. 13 is a flow diagram illustrating example operations by a receiving device for wireless communications with adaptive modulo base selection for non-linear precoding, in accordance with certain aspects of the present disclosure.

FIG. 13 is a flow diagram illustrating example operations 1300 for wireless communications with adaptive modulo base selection for non-linear precoding, in accordance with certain aspects of the present disclosure. The operations 1300 may be performed by a receiving device, such as a UE (e.g., a UE 120 in the wireless communication network 100). The operations 1300 may be complementary operations by the receiving device to the operations 1000 by the transmitting device.

The operations 1300 may begin, at 1302, by receiving a transmission (e.g., an MU transmission) from a BS. The transmission includes one or more data streams for the UE.

At 1304, the receiving device receives a signal from the BS for the identification of a modulo base applied to at least one of the one or more data streams. According to certain aspects, the receiving device provides an indication to the BS of a capability of the receiving device for performing a modulo operation. The transmission and the signal from the BS may be in response to the indication. In some examples, the signal includes an indication of a value and a modulation order and/or coding scheme. In some cases, the signal includes only the modulation order and/or coding scheme.

At 1306, the receiving device determines the modulo base for at least one of the one or more data streams based on the signal. In some examples, the UE determines the modulo base based on the value and the modulation order and/or coding scheme signaled from the BS. For example, the receiving device may be configured with a table, mapping, or information indicating modulo bases corresponding to the combination of the value and the modulation order and/or coding scheme, such as the information from the Table 1100 in FIG. 11. In some examples, the receiving device determines the modulo base from a formula, such as the formula shown above. For example, the receiving device may be configured with a table, mapping, or information indicating a scaling factor corresponding to the signaled value, such as the information from the Table 1200 in FIG. 12. The receiving device may use the scaling factor and the signaled modulation in the formula to compute the modulo base T. In some examples, the receiving device receives RRC signaling configuring the table, mapping, or information. In some examples, the table, mapping, or information is defined in the wireless specifications and hardcoded at the receiving device. In some examples, the table, mapping, or information is defined in the wireless specifications, and the RRC signaling configures a subset of the table, mapping, or information from the wireless specification. In some examples, the modulation order and/or coding scheme and/or the value are received in DCI from the BS. In some cases, the indicator may be received from the BS via higher layer signaling RRC and/or MAC-CE.

At 1308, the receiving device decodes the at least one data stream using the modulo base. The decoding includes performing a modulo operation to the received transmission.

Figure 14:
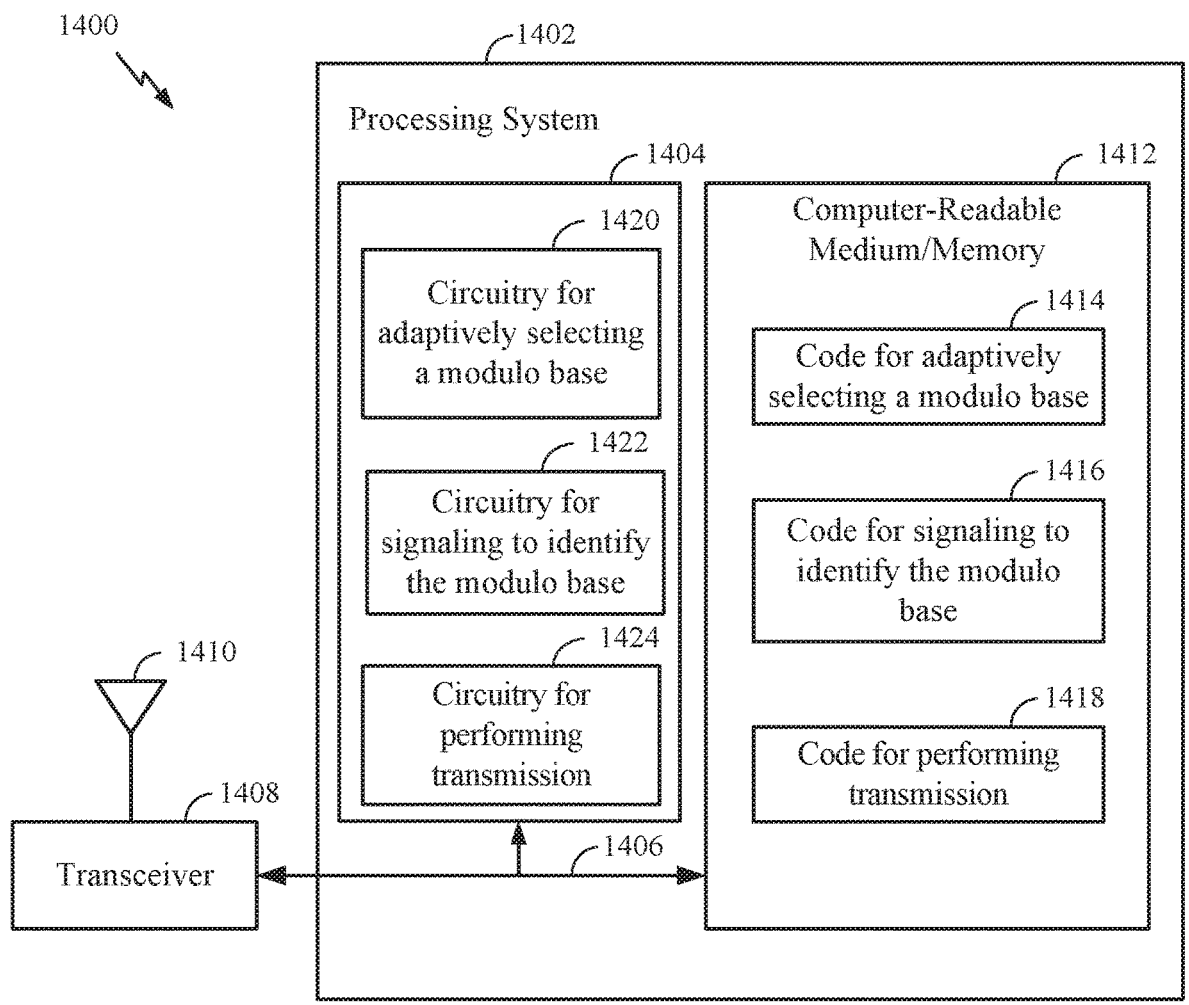
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 10. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer executable code) that when executed by the processor 1404, cause the processor 1404 to perform the operations illustrated in FIG. 10, or other operations for performing the various techniques discussed herein for adaptive modulo base selection for non-linear precoding. In certain aspects, computer-readable medium/memory 1412 stores code 1414 for adaptively selecting a modulo base; code 1416 for signaling to identify the modulo base; and code 1418 for performing transmission. In certain aspects, the processor 1404 has circuitry configured to implement the code stored in the computer-readable medium/memory 1412. The processor 1404 includes circuitry 1420 for adaptively selecting a modulo base; circuitry 1422 for signaling to identify the modulo base; and circuitry 1424 for performing transmission.

Figure 15:
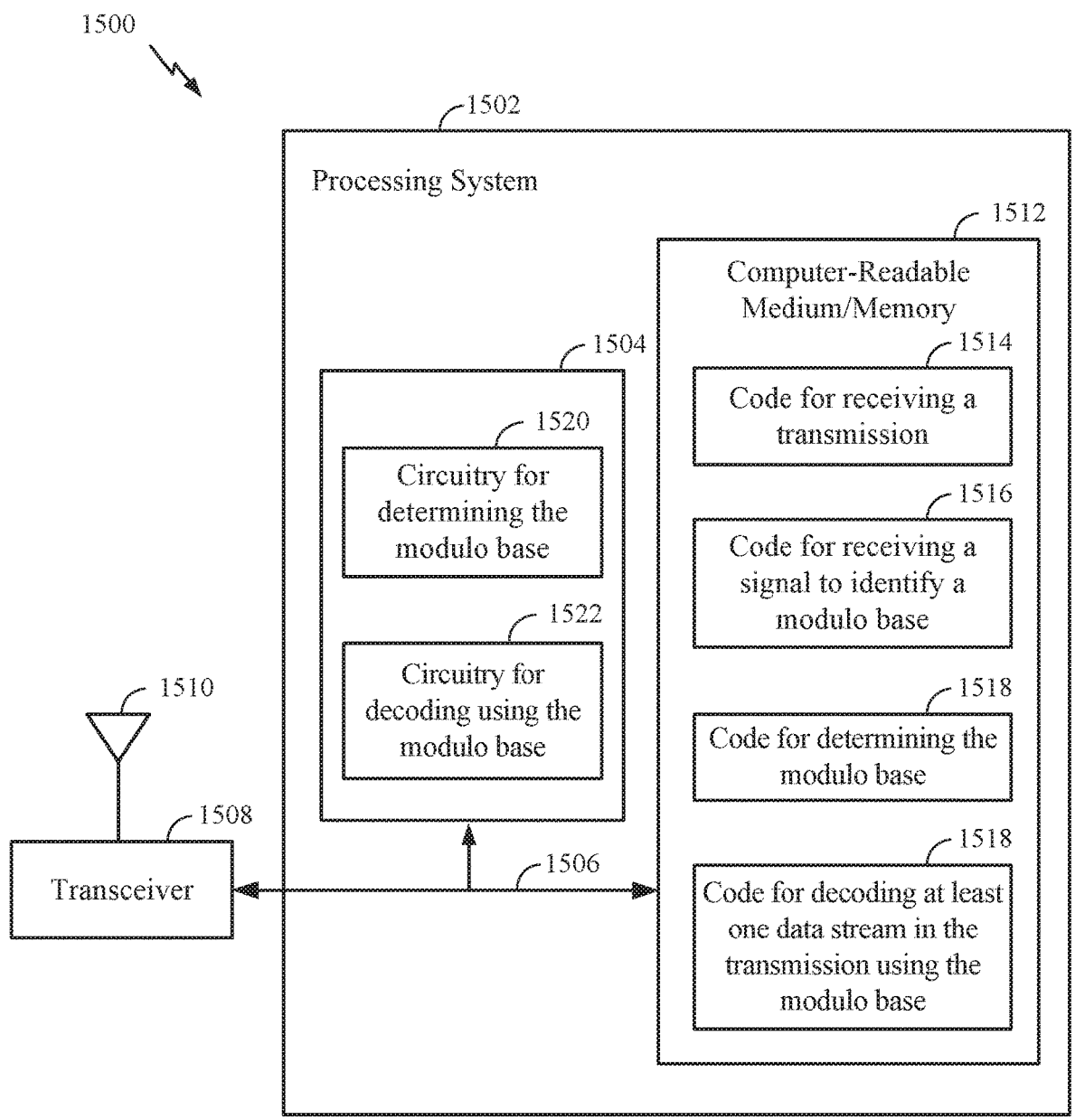
FIG. 15 illustrates another communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 13. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer executable code) that when executed by the processor 1504, cause the processor 1504 to perform the operations illustrated in FIG. 13, or other operations for performing the various techniques discussed herein for adaptive modulo base selection. In certain aspects, computer-readable medium/memory 1512 stores code 1514 for receiving a transmission; code 1516 for receiving a signal to identify a modulo base; code 1518 for determining the modulo base, and code 1518 for decoding at least one data stream in the transmission using the modulo base. In certain aspects, the processor 1504 has circuitry configured to implement the code stored in the computer-readable medium/memory 1512. The transceiver 1508 is configured to receive the transmission and receive the signal to identify the modulo base. The processor 1504 includes circuitry 1520 for determining the modulo base and circuitry 1522 for decoding using the modulo base.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 11 and FIG. 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
adaptively selecting a modulo base, from a set of candidate modulo bases, for a data stream for at least one user equipment (UE) in a transmission to one or more UEs, wherein the modulo base is selected based on one or more parameters;
transmitting a signal for at least one UE of the one or more UEs to identify the selected modulo base; and
performing the transmission to the one or more UEs.

2. The method of claim 1, wherein performing the transmission comprises:
perturbing a constellation symbol, generated based on the data stream, in an original constellation to a different constellation to account for predicted interference between at least two UEs; and
performing a modulo operation to return the perturbed constellation symbol to the original constellation.

3. The method of claim 1, wherein the one or more parameters comprises at least one of: a modulation order of the data stream of the at least one UE, a signal-to-noise-ratio (SNR) of the at least one UE, or a signal-to-noise-plus-interference ratio (SINR) of the at least one UE, or accuracy of channel state information (CSI) of the one or more UEs obtained by the BS.

4. The method of claim 3, wherein the adaptive selection comprises;
increasing the modulo base if the SNR or SINR is below a threshold or the accuracy of the CSI obtained by the BS is below a threshold; and
decreasing the modulo base if SNR or SINR is above a threshold or the accuracy of the CSI obtained by the BS is above a threshold.

5. The method of claim 1, further comprising:
adaptively re-selecting the modulo base for subsequent transmissions based on changes to the one or more parameters.

6. The method of claim 2, further comprising receiving an indication from the at least one UE of a capability of the UE for performing a modulo operation, wherein the adaptive selection and transmission based on modulo operation are in response to the indication.

7. The method of claim 1, wherein the set of candidate modulo bases comprises a first set of candidate modulo bases applied to a first modulation order, and a second set of candidate modulo bases applied to a second modulation order.

8. The method of claim 7, wherein the set of candidate modulo bases comprises:
a first candidate modulo base of the first set of candidate modulo bases for the first modulation order obtained based on a first scaling factor and the first modulation order; and
a second candidate modulo base of the second set of candidate modulo bases for the second modulation order obtained based on the first scaling factor and the second modulation order.

9. The method of claim 8, wherein the set of candidate modulo bases further comprises:
a third candidate modulo base of the first set of candidate modulo bases for the first modulation order obtained based on a second scaling factor and the first modulation order; and
a fourth candidate modulo base of the second set of candidate modulo bases for the second modulation order obtained based on the second scaling factor and the second modulation order.

10. The method of claim 7, wherein:
adaptively selecting the modulo base comprises determining one modulo base from the first or second set of candidate modulo bases;
the signal for the at least one UE to identify the selected modulo base comprises transmitting at least one of the modulation order or a coding scheme to the UE; and
the at least one of the modulation order or the coding scheme corresponds to the selected modulo base.

11. The method of claim 10, wherein:
the signal for the at least one UE to identify the selected modulo base further comprises transmitting an indicator of the selected modulo base; and
the indicator together with the at least one of the modulation order or the coding scheme corresponds to selected modulo bases.

12. The method of claim 11, wherein the indicator is signaled to the UE via at least one of: downlink control information (DCI), radio resource control (RRC) signaling, or a medium access control (MAC) control element (CE).

13. The method of claim 1, wherein the set of candidate modulo bases is fixed in a specification.

14. The method of claim 1, wherein the set of candidate modulo bases is configured via higher layer signaling.

15. The method of claim 14, wherein the higher layer signaling comprises radio resource control (RRC) signaling or a medium access control (MAC) control element (CE).

16. The method of claim 15, wherein:
the set of candidate modulo bases is first configured via RRC; and
a subset of the set of candidate modulo bases is configured by the MAC-CE.

17. A method for wireless communications by a user equipment (UE), comprising:
receiving a transmission from a base station (BS) comprising one or more data streams for the UE;
receiving a signal from the BS for an identification of a modulo base applied to at least one of the one or more data streams;
selecting the modulo base, from a set of candidate modulo bases, for at least one of the one or more data streams based on the signal; and
decoding the at least one data stream using the modulo base.

18. The method of claim 17, wherein the decoding comprises:
performing a modulo operation to the received transmission.

19. The method of claim 17, further comprising providing an indication to the BS of a capability of the UE for performing a modulo operation.

20. The method of claim 17, wherein the set of candidate modulo bases comprises a first set of candidate modulo bases applied to a first modulation order, and a second set of candidate modulo bases applied to a second modulation order.

21. The method of claim 20, wherein the set of candidate modulo bases comprises:
a first candidate modulo base of the first set of candidate modulo bases for the first modulation order obtained based on a first scaling factor and the first modulation order; and
a second candidate modulo base of the second set of candidate modulo bases for the second modulation order obtained based on the first scaling factor and the second modulation order.

22. The method of claim 21, wherein the set of candidate modulo bases further comprises:
a third candidate modulo base of the first set of candidate modulo bases for the first modulation order obtained based on a second scaling factor and the first modulation order; and
a fourth candidate modulo base of the second set of candidate modulo bases for the second modulation order obtained based on the second scaling factor and the second modulation order.

23. The method of claim 20, wherein:
selecting the modulo base, from the set of candidate modulo bases, for the at least one data stream comprises selecting one modulo base from the first or second set of candidate modulo bases;
the signal for the UE to identify the selected modulo base indicates at least one of the modulation order or a coding scheme; and
the at least one of the modulation order or the coding scheme corresponds to the selected modulo base.

24. The method of claim 23, wherein:
the signal for the UE to identify the selected modulo base further comprises an indicator of the selected modulo base; and
the indicator together with the at least one of the modulation order or the coding scheme corresponds to selected modulo bases.

25. The method of claim 24, wherein the indicator is received via at least one of:
downlink control information (DCI), radio resource control (RRC) signaling, or a medium access control (MAC) control element (CE).

26. The method of claim 17, wherein the set of candidate modulo bases is fixed in a specification.

27. The method of claim 17, wherein the set of candidate modulo bases is configured via higher layer signaling.

28. The method of claim 27, wherein the higher layer signaling comprises radio resource control (RRC) signaling or a medium access control (MAC) control element (CE).

29. The method of claim 28, wherein:
the set of candidate modulo bases is first configured via RRC; and
a subset of the set of candidate modulo bases in configured by the MAC-CE.

* * * * *